(12) United States Patent
Warkoski et al.

(10) Patent No.: US 8,008,408 B2
(45) Date of Patent: Aug. 30, 2011

(54) AROMATIC POLYIMIDE COMPOSITION AND ARTICLES MANUFACTURED THEREFROM

(75) Inventors: Gregory Warkoski, Cumming, GA (US); Philip Schild, Brookhaven, PA (US); Romano Empaynado, Suwanee State, GA (US); Brian A. Stern, Duluth, GA (US)

(73) Assignee: SOLVAY (Société Anonyme), Brussels (BE)

( * ) Notice: Subject to any disclaimer, the term of this patent is extended or adjusted under 35 U.S.C. 154(b) by 1132 days.

(21) Appl. No.: 11/572,815

(22) PCT Filed: Apr. 26, 2005

(86) PCT No.: PCT/EP2005/051847
§ 371 (c)(1),
(2), (4) Date: Mar. 16, 2007

(87) PCT Pub. No.: WO2006/010651
PCT Pub. Date: Feb. 2, 2006

(65) Prior Publication Data
US 2007/0222108 A1    Sep. 27, 2007

Related U.S. Application Data

(60) Provisional application No. 60/592,134, filed on Jul. 30, 2004.

(30) Foreign Application Priority Data

Sep. 20, 2004   (EP) .................................... 04104536

(51) Int. Cl.
*C08L 79/08* (2006.01)
*C08L 27/12* (2006.01)

(52) U.S. Cl. ........ 525/515; 524/538; 525/179; 525/180; 525/181; 525/182

(58) Field of Classification Search .................. 524/514, 524/538; 525/179, 180, 181, 182
See application file for complete search history.

(56) References Cited

U.S. PATENT DOCUMENTS

| 4,433,104 A | 2/1984 | Giles, Jr. |
| 4,749,752 A | 6/1988 | Youlu et al. |
| 4,816,516 A | 3/1989 | Yamaya et al. |
| 5,371,143 A | 12/1994 | Novak et al. |
| 2005/0070659 A1* | 3/2005 | Shiow-Ling et al. ......... 524/502 |

FOREIGN PATENT DOCUMENTS

JP    7 252418    10/1995

* cited by examiner

*Primary Examiner* — Ana L Woodward
(74) *Attorney, Agent, or Firm* — Oblon, Spivak, McClelland, Maier & Neustadt, L.L.P.

(57) ABSTRACT

Aromatic polyimide composition and articles manufactured therefrom. This invention relates to an aromatic polyimide molding composition, comprising at least one aromatic polyimide (A) chosen from the group consisting of aromatic polyamide-imide, aromatic polyesterimides and aromatic polyimide free of any ester and amide group of specific type and typically from 0.5 to 30% wt of at least one fluoroelastomer (B), with respect to the total weight of (A) and (B), to a method for manufacturing the same, to a molding process of the same, and to the articles manufactured therefrom. Preferably, the component (A) of the composition is at least one aromatic polyamide-imide manufactured by a process including the polycondensation reaction between (i) at least one acid monomer chosen from trimellitic anhydride and trimellitic anhydride monoacid halides and (ii) at least one commoner chosen from the group consisting of 4,4'-diaminodiphenylmethane, 4,4'-diaminodiphenylether, m-phenylenediamine and mixtures therefrom. Advantageously, the aromatic polyimide composition of the invention, owed to its improved flexibility during the molding process, is suitable for the manufacture of articles from mold of complex geometries, such as undercuts, without permanently deforming or cracking upon ejection from the mold.

22 Claims, No Drawings

AROMATIC POLYIMIDE COMPOSITION AND ARTICLES MANUFACTURED THEREFROM

This application is a 371 of PCT/EP05/51847 filed Apr. 26, 2005, and claims benefit of U.S. provisional application Ser. No. 60/592,134, filed Jul. 30, 2004.

This invention relates to an aromatic polyimide composition, to a method for manufacturing the same, to a molding process of the same, and to the articles therefrom.

Aromatic polyimide polymers, especially polyamideimides, have been specified for a wide variety of applications requiring strength and durability at extremely high temperature of molded parts. Molded components of aromatic polyimide resins are reliable under conditions too severe for other moldable thermoplastics.

Aromatic polyimide polymers are generally supplied at a relatively low molecular weight and limited imidization degree to facilitate processing, and the molded articles must be post-cured to achieve maximum properties.

The as-molded parts appear finished, but are actually weak, brittle, poor in chemical and wear resistance and do not have optimum thermal resistance.

Thus, molded parts are generally submitted to post-curing processes (heating at high temperature) to improve mechanical properties.

Since the as-molded articles made of aromatic polyimides, especially of polyamide-imide, are brittle, sensitive parts may crack upon ejection from the mold. In particular, it is extremely difficult to remove a part made of an aromatic polyimide from a mold containing complex geometries, such as for instance undercuts, unless side actions are used to avoid the parts to break when attempting to eject them from the tooling. Since the part design and tool layout options cannot eliminate undercut areas, some methods have thus been implemented in the previous art to try to face this problem. The undercuts or other complex geometries can be either realized on the final part after curing by machining the desired feature after molding, or accommodated by movable mold features, like collapsing cores or cores that can be removed manually from the mold.

Nevertheless, both of these methods are quite expensive. Machining the molded part is also time consuming and not practical for high volume applications. Collapsing cores or removable cores tend themselves to larger geometries, due to the spatial requirements in the tooling, thus are not adapted for the molding of smaller parts.

U.S. Pat. No. 4,433,104 discloses compositions comprising a polyetherimide complying with formula here below:

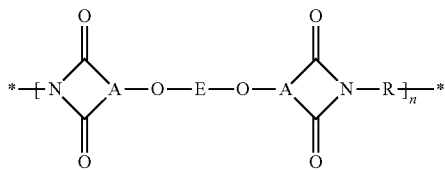

wherein A, E and R are aromatic groups, and a fluorinated polyolefin, for improving impact strength of said polyetherimide.

U.S. Pat. No. 4,816,516 discloses compositions based on aromatic polyetherimides, whose polyamic form is sketched in formula here below:

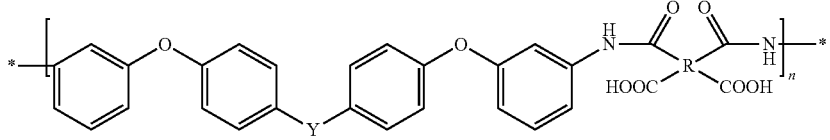

wherein Y is a bond or divalent bridging group and R is a tetravalent aliphatic or aromatic group, further comprising a fluororesin, preferably PTFE, said compositions having improved coefficient of friction and wear resistance.

U.S. Pat. No. 4,749,752 discloses fluoropolymer alloys comprising an extra-high molecular weight fluorinated ethylene-propylene copolymer (FEP, or TFE/HFP copolymer), to combine outstanding properties of PTFE material such as thermal and chemical stability and anti-stick properties with melt-processability of FEP. Polyimides are mentioned in a long list of other possible polymers which the particular FEP polymer can be admixed with.

JP 07-252418 discloses compositions having good "sliding" property (low coefficient of friction, wear resistance) but improved strength, comprising:

(i) a resin comprising a sulfone group;
(ii) a fluorinated resin;
(iii) a fluorinated polyimide, obtained from the reaction of a tetracarboxylic acid (or the corresponding di-anhydride) and a diamine, in which at least one of the two monomers is fluorinated.

According to one aspect of the present invention, the above-mentioned difficulties are remarkably overcome by an aromatic polyimide composition, comprising at least one aromatic polyimide (A) and at least one fluoroelastomer (B), wherein the aromatic polyimide is chosen from the group consisting of aromatic polyamide-imides (A-1), aromatic polyesterimides (A-2) and aromatic polyimides (A-3) free of any ester and any amide group of a specific type as described below.

Advantageously, the aromatic polyimide composition of the invention, owed to its improved flexibility at high temperature during the molding process, is suitable for the manufacture of articles from mold of complex geometries, such as undercuts, without permanently deforming or cracking upon ejection from the mold.

To the purpose of the present invention, "aromatic polyimide" is intended to denote any polymer comprising more than 50% wt of recurring units comprising at least one aromatic ring and at least one imide group, as such (formula 1A) or in its amic acid form (formula 1B):

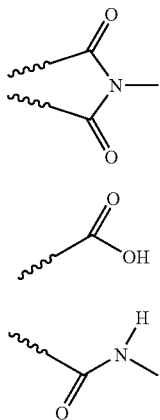

formula 1A formula 1B

The imide group, as such or in its corresponding amic acid form, is advantageously linked to an aromatic ring, as illustrated below:

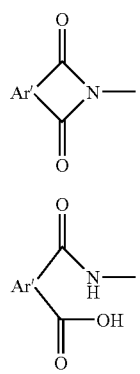

formula 2A formula 2B whereas Ar' denotes a moiety containing at least one aromatic ring. The imide group is advantageously present as condensed aromatic system, yielding a five- or six-membered heteroaromatic ring, such as, for instance, with benzene (phthalimide-type structure, formula 3) and naphthalene (naphthalimide-type structure, formula 4).

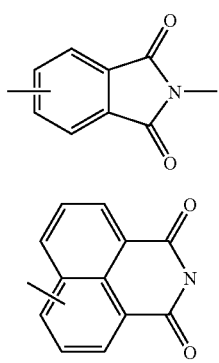

formula 3 formula 4

Aromatic polyimides free from ester and amide groups which are suitable for the invention [polyimides (A-3)] comprise more that 50% wt of recurring units selected from the group of formulae 5A to 5C here below:

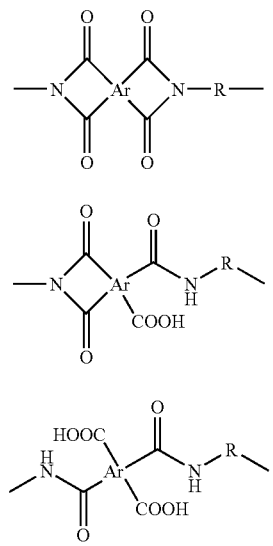

formula 5 A formula 5 B formula 5 C where:

Ar is typically:

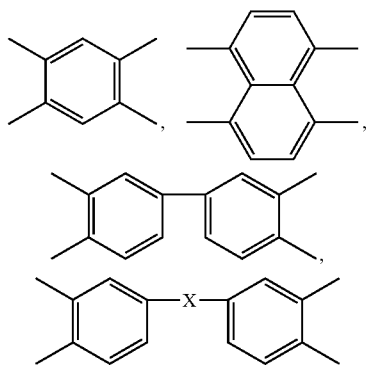

with X=

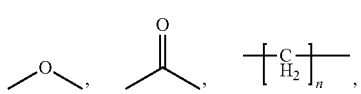

with n=1,2,3,4 or 5;

R is typically:

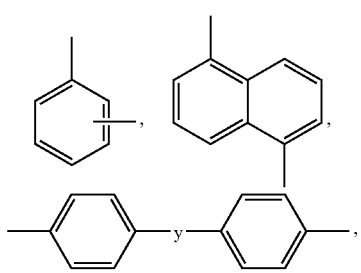

-continued

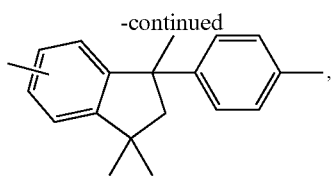

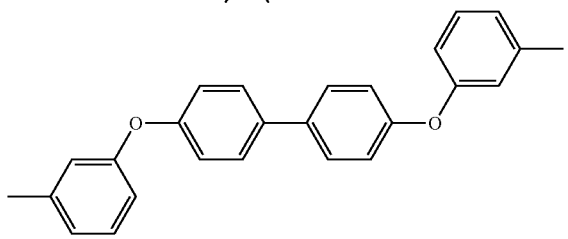

with Y=

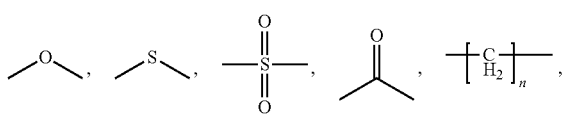

with n=0,1,2,3,4 or 5.

The aromatic polyimide composition comprises preferably at least one aromatic polyimide chosen from aromatic polyamide-imides and aromatic polyesterimides. Very preferably, it comprises at least one aromatic polyamide-imide. Still more preferably, it comprises, as main aromatic polyimide (i.e. representing more than 50% wt of the aromatic polyimide), at least one aromatic polyamide-imide. Excellent results were obtained when the aromatic polyimide composition comprised at least one aromatic polyamide-imide and was free of aromatic polyimides other than aromatic polyamide-imides.

To the purpose of the present invention, "aromatic polyesterimide" (A-2) is intended to denote any polymer comprising more than 50% wt of recurring units comprising at least one aromatic ring, at least one imide group, as such and/or in its amic acid form, and at least one ester group. Typically, aromatic polyesterimides are made by reacting at least one acid monomer chosen from trimellitic anhydride and trimellitic anhydride monoacid halides with at least one diol, followed by reaction with at lest one diamine.

To the purpose of the present invention, "aromatic polyamide-imide" (A-1) is intended to denote any polymer comprising more than 50% wt of recurring units comprising at least one aromatic ring, at least one imide group, as such and/or in its amic acid form, and at least one amide group which is not included in the amic acid form of an imide group [recurring units (R1)].

The recurring units (R1) are advantageously:

R1-a

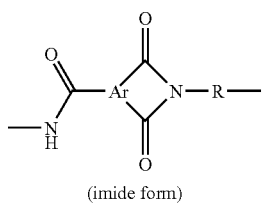

(imide form)

-continued

R1-b

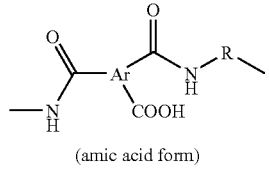

(amic acid form)

where:

Ar is typically:

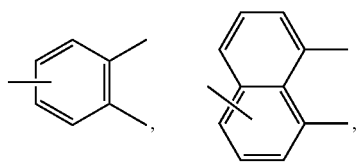

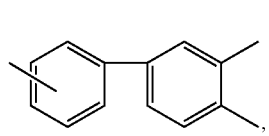

with X=

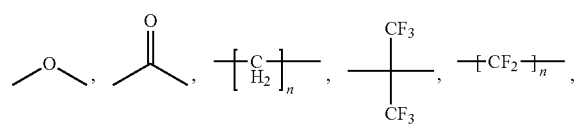

with n=1,2,3,4 or 5;

R is typically:

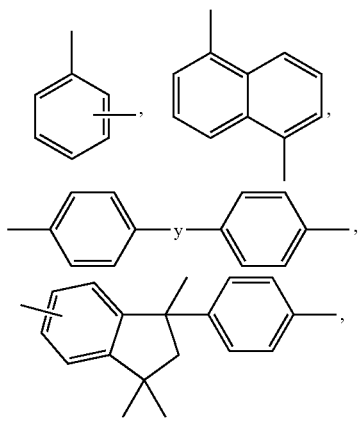

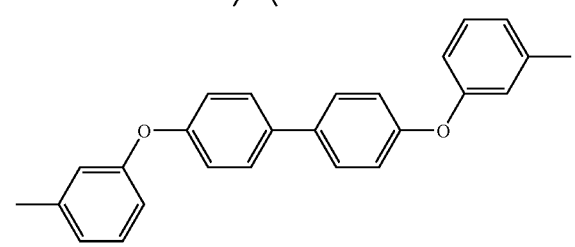

with Y=

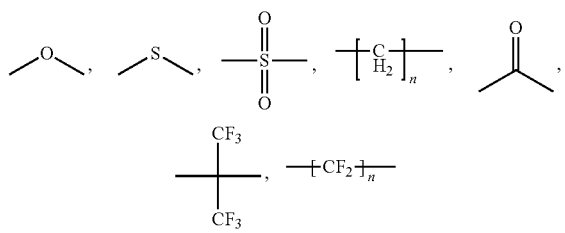

with n=0,1,2,3,4 or 5.

Preferably, the aromatic polyamide-imide comprises more than 50% of recurring units (R1) comprising an imide group in which the imide group is present as such, like in recurring units (R1-a), and/or in its amic acid form, like in recurring units (R1-b).

Recurring units (R1) are preferably chosen from:

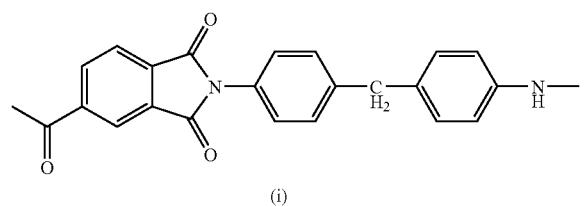
(i-a)

and/or the corresponding amide-amic acid containing recurring unit:

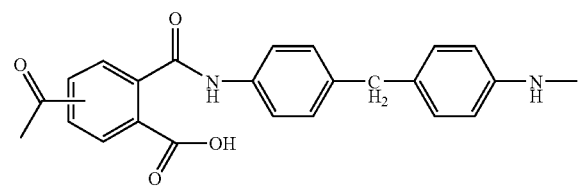
(i-b)

wherein the attachment of the two amide groups to the aromatic ring as shown in (i-b) will be understood to represent the 1,3 and the 1,4 polyamide-amic acid configurations;

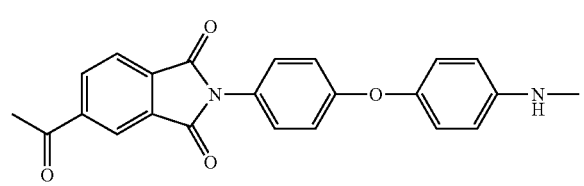
(ii-a)

and/or the corresponding amide-amic acid containing recurring unit:

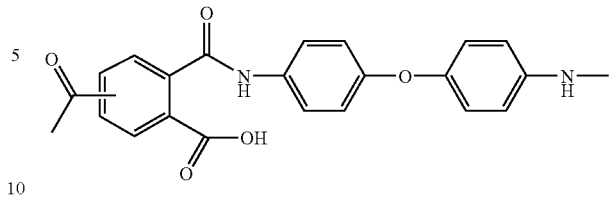
(ii-b)

wherein the attachment of the two amide groups to the aromatic ring as shown in (ii-b) will be understood to represent the 1,3 and the 1,4 polyamide-amic acid configurations; and

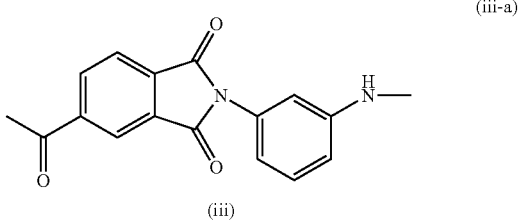
(iii-a)

and/or the corresponding amide-amic acid containing recurring unit:

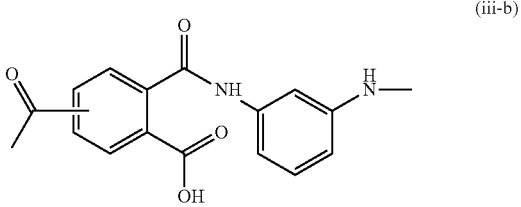
(iii-b)

wherein the attachment of the two amide groups to the aromatic ring as shown in (iii-b) will be understood to represent the 1,3 and the 1,4 polyamide-amic acid configurations.

Recurring units (R1) are preferably a mix of recurring units (ii) and (iii).

Very preferably, the aromatic polyamide-imide comprises more than 90% wt of recurring units (R1). Still more preferably, it contains no recurring unit other than recurring units (R1).

Excellent results were obtained with aromatic polyamide-imides consisting of a mix of recurring units (ii) and (iii).

Polymers commercialized by Solvay Advanced Polymers as TORLON® polyamide-imides comply with this criterion.

The aromatic polyamide-imide can be notably manufactured by a process including the polycondensation reaction between (i) at least one acid monomer chosen from trimellitic anhydride and trimellitic anhydride monoacid halides and (ii) at least one comonomer chosen from diamines and diisocyanates.

Among the trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine and mixtures thereof.

For the purposes of this invention, the term "fluoroelastomer" (B) is intended to designate a true elastomer or a polymer resin serving as a base constituent for obtaining a true elastomer, said true elastomer or polymer resin comprising more than 50% wt of recurring units derived from at least one ethylenically unsaturated monomer comprising at least one fluorine atom (hereafter, fluorinated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Advantageously the aromatic polyimide composition of the present invention comprises at least 0.5% wt, preferably at least 1% wt, more preferably at least 2% wt of fluoroelastomer (B), with respect to the total weight of (A) and (13).

Advantageously the aromatic polyimide composition of the present invention comprises at most 30% wt, preferably at most 15% wt, more preferably at most 10% wt, most preferably at most 7.5% wt of fluoroelastomer (B), with respect to the total weight of (A) and (3). Preferably, the aromatic polyimide composition of the invention comprises from 0.5 to 30% wt of fluoroelastomer (B), with respect to the total weight of (A) and (13).

Very good results were obtained when the aromatic polyimide composition comprised from 2 to 6% wt of fluoroelastomer (B), with respect to the total weight of (A) and (B).

According to a first embodiment of the invention, the fluoropolymer (B) is a polymer resin serving as a base constituent for obtaining a true elastomer.

Polymer resins serving as a base constituent for obtaining true elastomers are in general amorphous products or products having a low degree of crystallinity (crystalline phase less than 20% by volume) and a glass transition temperature ($T_g$) below room temperature. In most cases, these products correspond to copolymers having a $T_g$ below 0° C. and including reactive functional groups (optionally in the presence of additives) allowing the true elastomer to be formed by suitable curing methods.

The fluoroelastomer (B) comprises preferably more than 75% wt, more preferably more than 90% wt of recurring units derived from fluorinated monomers, and still more preferably more than 97% wt of recurring units derived from fluorinated monomers.

The fluoroelastomer (B) advantageously comprises recurring units derived from vinylidene fluoride ($VF_2$) or from tetrafluoroethylene (TEE). Preferably, fluoroelastomer (B) consists of recurring units derived from vinylidene fluoride ($VF_2$) or from tetrafluoroethylene (TFE) and at least one other fluoromonomer. The other fluoromonomer can be notably vinyl fluoride; trifluoroethylene; chlorotrifluoroethylene (CTFE); 1,2-difluoroethylene; tetrafluoroethylene (TFE); hexafluoropropylene (MRP); perfluoro(alkyl vinyl)ethers, such as perfluoro(methyl vinyl)ether (PMVE), perfluoro(ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $-SO_2F$, $-CO_2H$, $-CH_2OH$, $-CH_2OCN$ or $-CH_2OPO_3H$; the product of formula $CF_2=CFOCF_2CF_2SO_2F$; the product of formula $F(CF_2)_nCH_2OCF=CF_2$ in which n is 1, 2, 3,4 or 5; the product of formula $R_1CH_2OCF=CF_2$ in which $R_1$ is hydrogen or $F(CF_2)_z$, and z is 1, 2, 3 or 4; the product of formula $R_3OCF=CH_2$ in which $R_3$ is $F(CF_2)_z$ and z is 1, 2, 3 or 4; perfluorobutylethylene (PFBE); 3,3,3-trifluoropropene and 2-trifluoromethyl-3,3,3-trifluoro-1-propene.

As examples of fluoroelastomer, mention may be made of $VF_2$/HFP copolymers consisting of from 60 to 85% by moles of $VF_2$ and from 40 to 15% by moles of HFP, of $VF_2$/HFP/TFE terpolymers consisting of 45 to 85% by moles of $VF_2$, 15 to 45% by moles of HFP and up to 30% by moles of TFE, of $VF_2$/perfluoro(alkyl vinyl)ether/TFE terpolymers, consisting of from 50 to 80% by moles of $VF_2$, 5 to 50% by moles of perfluoro(alkyl vinyl)ether and up to 20% by moles of TFE, of $VF_2$/ethylene/HFP/TFE polymers, consisting of from 20 to 30% by moles of $VF_2$, from 10 to 30% by moles of ethylene (E) and from 10 to 30% by moles of TFE, the remaining being HFP, of $VF_2$/E/perfluoro(alkyl vinyl)ether/TFE polymers consisting of from 20 to 30% by moles of $VF_2$, from 10 to 30% by moles of ethylene, from 18 to 27% by moles of perfluoro(alkyl vinyl)ether and from 10 to 30% by moles of TFE, of perfluoro(alkyl vinyl)ether/TFE copolymers consisting of from 20 to 50% by moles of perfluoro(alkyl vinyl)ether and from 50 to 80% by moles of TFE and of $VF_2$/HFP/E/TFE polymers, consisting of from 4 to-75% by moles of $VF_2$, from 12 to 40% by moles of HFP, up to 35% by moles of E and from 2 to 60% by moles of TFE.

Very good results were obtained with fluoroelastomers consisting of recurring units derived from vinylidene fluoride ($VF_2$) and at least one other fluoromonomer.

Excellent results were obtained with $VF_2$/HFP copolymers consisting of from 60 to 85% by moles of $VF_2$ and from 40 to 15% by moles of HFP.

The fluoroelastomer (B) has a Mooney viscosity, measured according to ASTM D1646-04 (ML 1+10 @ 121° C./250 F), advantageously from 5 to 250, preferably from 7 to 150, more preferably from 40 to 50.

The fluoroelastomer (B) can be prepared by any known method, such as emulsion or micro-emulsion polymerization, suspension or micro-suspension polymerization, bulk polymerization and solution polymerization.

The fluoroelastomer is preferably prepared by emulsion polymerization, in the presence of a radical generator. Suitable radical generators are notably the alkaline persulphates, perborates and percarbonates. It is also possible to employ a combination of peroxy generators with reducers, such as sulphites, bisulphites, metabisulphites, thiosulphates, phosphites or hyposulphites of alkaline metals or of ammonium, or copper (I) salts, Fe (II) salts, silver salts and other easily oxidizable metal salts. It is possible to use also organic radical generators.

It is possible to operate in the presence of surfactants such as Na-laurylsulphate and ammonium perfluoro-octanoate.

The presence of a chain transfer may be useful during the polymerization in emulsion. The fluoroelastomers obtained by copolymerization in emulsion can be isolated from the latex according to conventional methods, for example coagulation with an electrolyte or by freezing, followed by filtration, washing and drying.

The fluoroelastomer can also be prepared by bulk polymerization or by solution polymerization in an organic liquid such as e.g. a chlorofluorohydrocarbon (Freon 113 or 114).

During the fluoroelastomer preparation, the reaction mixture is preferably heated in a pressure reactor, previously "washed" with an inert gas, to temperatures ranging from 45° C. to 135° C. and pressures of from 4 to 40 kg/cm$^2$.

According to a second embodiment of the invention, the fluoroelastomer (13) is cured. Should the fluoroelastomer (B) be cured, it is preferably a true elastomer as above defined, obtained by curing a polymer resin serving as a base constituent such as those above described.

Curing is advantageously carried out either by the peroxidic route or by the ionic route.

Should the fluoroelastomer (B) be cured by the peroxidic route, the polymer resin serving as base constituent comprises advantageously cure sites in its back-bone. Preferably, said polymer resin comprises iodine-containing cure-sites.

Curing by peroxidic route can be carried out, according to known techniques, comprising adding suitable peroxides capable to generate radicals by thermal decomposition. Among the most commonly used peroxides mention may be made of dialkyl peroxides, such as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy)butyl]carbonate. Other peroxidic systems are described, for example, in European patent applications EP 136,596 and EP 410,351.

Optionally, other compounds can be added when curing by the peroxidic route, such as:
a) curing coagents, in amounts generally in the range 0.5-10%, preferably 1-7% by weight with respect to the fluoroelastomer (B); among them there are usually used : tri-allyl-cyanurate; triallyl-isocyanurate (TAIC); tris (diallylamine)s-triazine; triallylphosphite; N,N-diallylacrylamide; N,N,N',N'-tetraallyl-malonamide; trivinyl-isocyanurate; 2,4,6-trivinyl-methyltrisiloxane, etc.; TAIC is particularly preferred; other preferred curing coagents are the bis-olefins described in EP 769,520. Other curing coagents which can be used are triazines described in European patent application EP 860,436 and in European patent application W097/05122;
b) optionally a metal compound, in amounts in the range 1-15%, preferably 2-10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphites of Ba, Na, K, Pb, Ca;
c) optionally acid acceptors of the non metal oxide type such as 1,8-bis-dimethylaminonaphthalene, octadecylamine, etc. as described in EP 708,797.

Curing by ionic route is advantageously carried out by addition of curing and accelerating agents well known in the prior art. The amount of the accelerating agents is advantageously in the range 0.05-5 weight parts per hundred parts of fluoroelastomer (B); the amount of curing agent is advantageously in the range 0.5-15, preferably 1-6 weight parts per hundred parts of fluoroelastomer (B).

As curing agents, aromatic or aliphatic polyhydroxylated compounds or their derivatives can be used, as described for example in EP 335,705 and U.S. Pat. No. 4,233,427. Among them mention may be notably made of di-, tri- and tetra-hydroxy-benzenes, -naphthalenes or -anthracenes; bisphenols wherein the aromatic rings are linked each other by an aliphatic, cycloaliphatic or aromatic bivalent radical, or by one oxygen or sulphur atom, or also by a carbonyl group. Aromatic rings can be substituted by one or more chlorine, fluorine, bromine atoms or by carbonyls, alkyls, acyls. In particular bisphenol AF is preferred.

As accelerating agent, it can be used for example: quaternary ammonium or phosphonium salts (see for example EP 335,705 and U.S. Pat. No. 3,876,654); amino-phosphonium salts (see for example U.S. Pat. No. 4,259,463); phosphoranes (see for example U.S. Pat. No. 3,752,787); iminic compounds described in EP 182,299 and EP 120,462; etc. Quaternary phosphonium salts and aminophosphonium salts are preferred.

Instead of using the accelerating agent and the curing agent separately, it can also be used from 1 to 5 weight parts, preferably from 2 to 4.5 weight parts per hundreds parts of fluoroelastomer (B) of an adduct between an accelerating agent and a curing agent in molar ratio from 1:2 to 1:5, preferably from 1:3 to 1:5, the accelerating agent being one of the onium-organic compounds having a positive charge, as above defined, the curing agent being selected from the above-mentioned compounds, in particular di- or polyhydroxy or di- or polythiol compounds; the adduct can be notably obtained by melting the reaction product between the accelerating agent and the curing agent in the mentioned molar ratios, or by melting the mixture of the adduct 1:1 added with the curing agent in the indicated amounts. Optionally, an excess of the accelerating agent with respect to that contained in the adduct is present; the case being, the excess is generally in amounts from 0.05 to 0.5 weight parts per hundred parts of fluoroelastomer (B).

For the preparation of the adduct, preferred cations are 1,1-diphenyl-1-benzyl-N-diethyl-phosphoranamine and tetrabutyl phosphonium; among the anions, bisphenol compounds are preferred wherein the two aromatic rings are linked by a bivalent radical selected from the perfluoroalkyl groups having from 3 to 7 carbon atoms, and the —OH are in para position.

The adduct preparation is described in European patent application in the name of the Applicant EP 684,277 herein incorporated by reference.

Optionally, other compounds are added when curing the fluoroelastomer (B) by the ionic route, such as:
i) one or more inorganic acid acceptors selected from those known to the skilled in the field of ionic curing of fluoroelastomers, in amounts from 1 to 40 weight parts for 100 parts of fluoroelastomer (B); among the compound of the type (i), MgO, $Ca(OH)_2$, $Sr(OH)_2$, $Ba(OH)_2$ can be mentioned.
ii) one or more basic compounds selected from those known in the ionic curing of fluoroelastomers in amounts from 0.5 to 10 weight parts per 100 parts of fluoroelastomer (B).

The basic compounds ii) are commonly selected from organic metal salts of weak acids, such as for example carbonates, benzoates, oxalates and phosphites of Ca, Sr, Ba, Na and K.

Curing either by the peroxide or the ionic route is advantageously carried out in crosslinking static mixers or in other suitable devices well-known to those skilled in the art. These devices generally operate under pressure; pressure ranges from 1 to 100 bar, preferably from 1 to 75 bar, even more preferably from 1 to 50 bar.

Should the fluoroelastomer (B) be cured, a crushing or regrinding step generally follows the curing process, to make the cured fluoroelastomer (B) available as a powder for the preparation of the composition according to the invention. The powder of the cured fluoroelastomer (B) has an average particle size of advantageously at most 500 μm, preferably at most 350 μm, more preferably at most 250 μm.

Optionally, the aromatic polyimide composition of the present invention can further comprise fillers, lubricating agents, mold release agents, heat stabilizer, anti-static agents, extenders, reinforcing agents, organic and/or inorganic pigments like $TiO_2$, carbon black, acid scavengers, such as MgO, flame-retardants, smoke-suppressing agents and the like.

By way of non-limiting examples of fillers, mention may be made of mica, alumina, talc, carbon black, glass fibers, carbon fibers, graphite in the form of fibers or of powder, aramid polymers in the form of fibers or of powder, carbonates such as calcium carbonate, macromolecular compounds and the like. As examples of aramid polymers mention may be made of commercially available SPECTRA®, KEVLAR®, and TWARON® aromatic polyamides. Preferably, the aromatic polyimide composition of the invention further comprises a filler chosen among mica, glass fibers, carbon fibers, aramid polymers and graphite in the form of fibers or of powder.

Should the aromatic polyimide composition further comprise a filler, its weight amount is advantageously of at most 50% wt, preferably at most 40%, more preferably at most 30% wt, with respect to the total weight of the composition.

As lubricating agents we can mention graphite, perfluorinated polymers, such as TFE polymers (for instance PTFE, PFA, MFA), silicone oil and the like.

Mold release agents that can be used in the compositions according to the invention are perfluorinated polymers, such as TFE polymers (for instance PTFE, PFA, MFA), silicone oil and the like.

The invented composition further comprises preferably a PTFE (i.e. a homopolymer of tetrafluoroethylene) and, more preferably, a non fibrillating PTFE (commonly also referred to as "low molecular weight PTFE" or "low melt viscosity PTE").

The non fibrillating PTFE has an average molecular weight in number of preferably below 700 000 (as determined by conventional GPC technique).

Besides, the non fibrillating PTFE has preferably an average molecular weight in number of preferably above 50 000 (as determined by conventional GPC technique).

The non fibrillating PTFE has preferably a melt viscosity of below $10^4$ Pa×s, as measured at 372° C. in accordance with the procedure ASTM D1239-52T, modified as described in U.S. Pat. No. 4,380,618.

The non fibrillating PTFE is preferably obtained by irradiation degradation of a high molecular weight homopolymer of tetrafluoroethylene (typically, with an average molecular weight in number above 2 000 000), or directly by polymerization technique such as described in example 1 of U.S. Pat. No. 5,223,343.

The non fibrillating PTFE is usually in the form of finely divided solids, and is then commonly referred to as "PTFE micropowder". The finely divided solids have an average particle size of preferably less than 100 μm, more preferably less than 20 μm, still more preferably less than 10 μm and the most preferably less than 5 μm.

The non fibrillating PTFE has preferably the thermal stability, chemical inertness, lubricity, and high melting temperature similar to high molecular weight PTFEs.

An especially suitable non fibrillating PTFE is POLYMIST® XPH-698 PTFE, available from Solvay Solexis, Inc. Other suitable non fibrillating PTFEs are commercially available notably from DuPont as ZONYL® PTFE (e.g. ZONYL® MP1600 grade), and from Daikin Industries, Ltd. as LUBLON® (e.g. LUBLON® L-5 PTFE).

The weight of the PTFE, based on the total weight of the composition, is advantageously at least 0.1%.

Besides, the weight of the PTFE, based on the total weight of the composition, is advantageously at most 20%.

Another aspect of the present invention concerns to a process for manufacturing the aromatic polyimide composition as above described, which comprises mixing the aromatic polyimide (A) and the fluoroelastomer (B).

Advantageously, the process comprises mixing by dry blending and/or melt compounding the polyimide (A) and the fluoroelastomer (B).

Preferably, the polyimide (A) and the fluoroelastomer (B) are mixed by melt compounding.

Advantageously, the aromatic polyimide (A) and the fluoroelastomer (B) are melt compounded in continuous or batch devices. Such devices are well-known to those skilled in the art.

Examples of suitable continuous devices to melt compound the composition of the invention are notably screw extruders. Preferably, the aromatic polyimide (A) and the fluoroelastomer (B) are melt compounded in a twin-screw extruder.

Should the fluoroelastomer (B) in the composition of the invention be cured, curing can be realized:
  before mixing by dry blending and/or melt compounding the polyimide (A) and the fluoroelastomer (B), and/or
  during the mixing, and/or
  after the mixing.

Preferably, the fluoroelastomer (B) is cured before mixing (A) and (B).

Optionally, fillers, thickening fillers, lubricating agents, mold release agents, heat stabilizer, anti-static agents, extenders, reinforcing agents, organic and/or inorganic pigments like $TiO_2$, carbon black, acid scavengers, such as MgO, flame-retardants, smoke-suppressing agents may be added to the composition during the compounding step.

Still another aspect of the invention is a molding process of the aromatic polyimide composition of the invention, which comprises:
(I) melting the aromatic polyimide composition at a temperature between 250 and 400° C., so as to obtain a melt composition;
(II) filling a mold cavity with the melt composition, so as to obtain a molded article;
(III) releasing the molded article.

The aromatic polyimide composition is melted advantageously in a movable-screw extruder injection molding machine, and more preferably in a movable-reciprocating-screw injection molding machine.

The screw of the extruder injection molding machine possesses a compression-ratio preferably not exceeding 1.75; a compression ratio between 1:1 and 1.5:1 gave very good results.

The aromatic polyimide composition is melt at a temperature preferably between 275 and 375° C., more preferably between 250 and 350° C.

The injection molding machine has a shot size (i.e. the maximum amount of material injected in a single forward movement of the screw) preferably from 50% to 80% of the barrel capacity (i.e. total capacity of the screw).

Single-cavity or multi-cavity mold design can be used in the molding process of the invention. The mold cavity typically opens into two or more parts, which are usually held together by either hydraulic or toggle clamps.

Optionally, the mold may comprise "undercuts areas". To the purpose of the present invention, the term undercuts area is intended to denote a mold zone providing a molded article having at least one dimension exceeding the one of the mold zone through which it must pass to be ejected, so that the molded article has to be deformed, usually shrunk or stretched, to be released from the mold, before recovering its initial shape.

Undercuts can be classified notably in internal and external undercuts. Undercuts located in the outside contours of the molded articles are usually called external undercuts; located on the inside contours, they are usually called internal undercuts.

As non limitative example of internal undercut, mention may be notably made of a mold zone having the shape of a sphere core, which consists of more than 50% of the sphere. The lower diameter of the hollow cavity of molded article therefrom would have to stretch over the core forming the inner feature of the sphere to release from the mold.

As non limitative example of external undercut, mention may be notably made of a mold zone providing for a tube feature having an outer diameter at one end exceeding the inner diameter of the mold zone though which it must be ejected, so that shrinking is required for releasing.

Optionally, the process according to the invention comprises in addition a step (IV), subsequent to step (III), consisting in post-curing the molded article.

Advantageously, the post-curing step includes placing the molded articles in an oven, preferably in a forced-air oven, and thermally treating them to a series of increasing temperatures for various times.

Advantageously, the temperature in the post-curing step is at least 120° C., preferably at least 130° C. and advantageously at most 320° C., preferably at most 300° C.

Advantageously, the curing time in the post-curing step is at least 6 hours, more preferably at least 12 hours, most preferably at least 24 hours.

Advantageously, the aromatic polyimide molding composition, thanks to its improved flexibility at high temperature during the molding process, is particularly adapted for the fabrication of articles, in particular of articles from mold of complex geometries, for instance undercuts, without permanently deforming or cracking upon ejection from the mold.

Then, a last object of the invention is an article comprising the aromatic polyimide composition as described above or prepared by the process as described above.

The article is advantageously a molded article. Preferably the article is a molded article comprising undercut features. To the purpose of the invention, the term "undercut feature" denotes a shape obtainable by means of a mold cavity having undercut areas.

Non imitative examples of molded articles comprising the inventive composition are ball bearing cages, Conrad retainers, automotive water outlet, and the like.

The present invention is described in greater detail below by referring to the Examples; however, the present invention is not limited to these examples.

Melt Compounding General Procedure:

The aromatic polyamide-imide Torlon® 4000 T powder (prepared from trimellitic acid chloride, 4,4'-diaminodiphenylether and metaphenylenediamine), commercially available from Solvay Advanced Polymers was compounded in a Berstorff—B25 twin screw extruder (screw design: Berstorff 36T), with atmospheric venting (open vent port) in combination with suitable amount of Tecnoflo® NM fluoroelastomer, a $VF_2$/HFP copolymer, having a Mooney viscosity, measured according to ASTM D1646-04 (ML 1+10@ 121° C./250 F), of 46, commercially available from Solvay Solexis, and optionally magnesium oxide (Kyowa KM 3150), $TiO_2$ (Ti-Pure R 900), Polymist® XPH-698 PTFE powder, commercially available from Solvay Solexis and a carbon black Torlon® masterbatch (containing 10% CB in Torlon® 4000T).

Details of temperature profile of the compounding process are joined Table 1.

TABLE 1

|  | Set point | Actual |
|---|---|---|
| Zone 1 (° C.) | 260 | 261 |
| Zone 2 (° C.) | 310 | 310 |
| Zone 3 (° C.) | 310 | 310 |
| Zone 4 (° C.) | 310 | 310 |
| Zone 5 (° C.) | 325 | 325 |
| Zone 6 (° C.) | 325 | 325 |
| Zone 7 (° C.) | 325 | 325 |
| Die temperature (° C.) | 330 | 330 |
| RPM | 100 | 100 |

Injection Molding General Procedure:

The pellets of the melt compounded compositions were fed to an injection molding machine, equipped with a screw extruder and a mold to prepare ASTM D 638 tensile bars. Details of temperature profile of the compounding process are joined Table 2.

TABLE 2

|  | Set point |
|---|---|
| Feed Zone (° C.) | 354 |
| Middle Zone (° C.) | 360 |
| Front Zone (° C.) | 360 |
| Nozzle (° C.) | 365.5 |
| Cooling time (sec) | 12-15 |

Mold temperature ranged from 160 to 220 ° C.

Within 15 to 30 seconds after the tensile bar was ejected from the mold, the ends of the bar were grabbed and the bar was bended in a U form. Alternatively, within 15 to 30 seconds after the tensile bar was ejected from the mould, pliors were put on the ends of the bar and the bar was twisted 180-270 degrees.

Results of bending and twist test on tensile bars off the mold are summarized in Table 3.

TABLE 3

| Component |  | Comparative example 1 | Comparative example 2 | Example 3 | Example 4 | Example 5 | Example 6 |
|---|---|---|---|---|---|---|---|
| Torlon ® 4000 T Polyamide-imide | wt % | 96.5 | 97.5 | 93.7 | 91.5 | 91.2 | 86.2 |
| Tecnoflon ® NM fluoroelastomer | wt % | 0 | 0 | 3 | 5 | 3 | 3 |

TABLE 3-continued

| Component | | Comparative example 1 | Comparative example 2 | Example 3 | Example 4 | Example 5 | Example 6 |
|---|---|---|---|---|---|---|---|
| MgO | wt % | 0 | 0 | 0.3 | 0.5 | 0.3 | 0.3 |
| TiO₂ | wt % | 3 | 0 | 0 | 0 | 0 | 0 |
| Polymist ® XPH-698 PTFE | wt % | 0.5 | 0 | 0.5 | 0.5 | 0.5 | 0.5 |
| Torlon ® 4000 T Polyamide-imide/ carbon black masterbatch | wt % | — | 2.5 | 2.5 | 2.5 | 5 | 10 |
| Total | wt % | 100 | 100 | 100 | 100 | 100 | 100 |
| Bending test | Comments | Broke into 4 pieces, very brittle | Broke into 4 pieces, very brittle | Good: both ends touched without cracking | Good: both ends touched without cracking | Good: both ends touched without cracking | Good: both ends touched without cracking |
| Twist test | Comments | Not tested | Not tested | Not tested | Good | Good | Good |

The invention claimed is:

1. An aromatic polyimide composition, comprising:
at least one aromatic polyimide (A); and
at least one fluoroelastomer (B),
wherein the aromatic polyimide (A) is chosen from the group consisting of aromatic polyamide-imides (A-1) comprising more than 50% wt of recurring units (R1) comprising at least one aromatic ring, at least one imide group in at least one form selected from the group consisting of its imide form and its amic acid form, and at least one amide group which is not included in the amic acid form of an imide group,
said composition comprising from 0.5 to 30% wt of fluoroelastomer (B) with respect to the total weight of (A) and (B).

2. The composition according to claim 1, wherein said composition comprises from 0.5 to 10% wt of fluoroelastomer (B), with respect to the total weight of (A) and (B).

3. The composition according to claim 2, wherein said composition comprises from 2 to 6% wt of fluoroelastomer (B), with respect to the total weight of (A) and (B).

4. The composition according to claim 1, wherein recurring units (R1) are selected from recurring units (R1-a) and (R1-b):

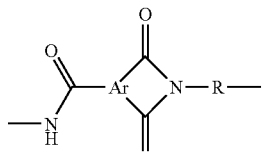

R1-a

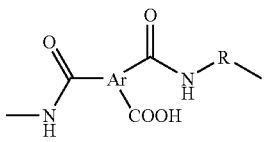

R1-b where:
Ar is:

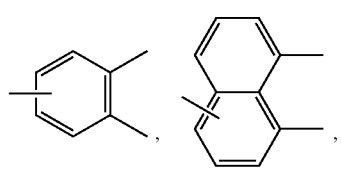

-continued

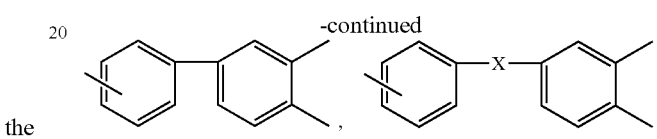

with X=

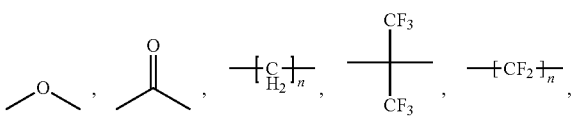

with n=1,2,3,4 or 5;

R is:

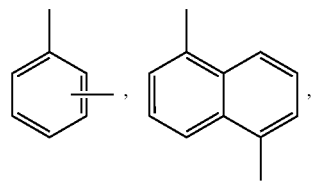

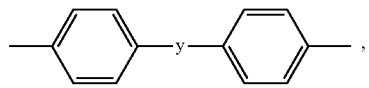

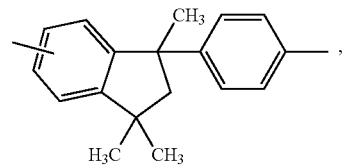

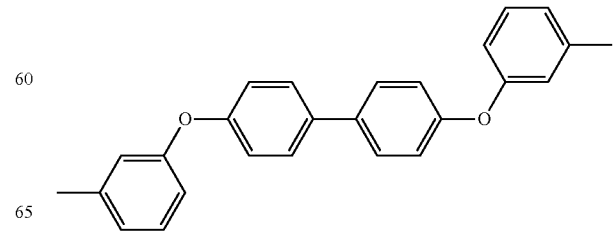

with Y =

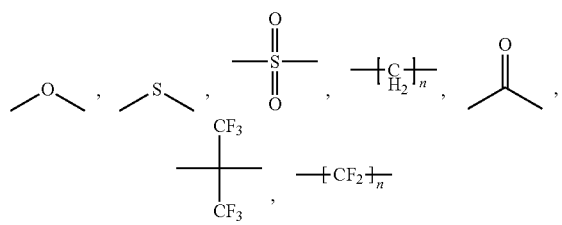

with n=0,1,2,3,4 or 5.

5. The composition according to claim 1, wherein the aromatic polyamide-imide is manufactured by a process including a polycondensation reaction between (i) at least one acid monomer chosen from trimellitic anhydride and trimellitic anhydride monoacid halides and (ii) at least one comonomer chosen from diamines and diisocyanates.

6. The composition according to claim 5, wherein the comonomer is chosen from the group consisting of 4,4'-diaminodiphenyl methane, 4,4'-diaminodiphenylether, m-phenylenediamine and mixtures thereof.

7. The composition according to claim 6, wherein the fluoroelastomer is a $VF_2$/hexafluoropropylene (HFP) copolymer consisting of from 60 to 85% by moles of $VF_2$ and from 40 to 15% by moles of HFP.

8. The composition according to claim 1, wherein the fluoroelastomer (B) has a Mooney viscosity, measured according to ASTM D1646-04 (ML 1+10 @ 121° C./250 F), from 5 to 250.

9. The composition according to claim 8, wherein the fluoroelastomer consists of recurring units derived from vinylidene fluoride ($VF_2$) and at least one other fluoromonomer.

10. The composition according to claim 1, wherein the fluoroelastomer is cured.

11. The composition according to claim 1, wherein it further comprises a filler selected from mica, glass fibers, carbon fibers, aramid polymers and graphite in the form of fibers or of powder.

12. The composition according to claim 1, wherein it further comprises a PTFE.

13. A process for manufacturing the aromatic polyimide composition according to claim 1, said process comprises mixing the aromatic polyimide (A) and the fluoroelastomer (B).

14. The process according to claim 13, said process comprises melt compounding in a twin-screw extruder.

15. An article comprising the composition prepared by the process of claim 14.

16. An article comprising the composition prepared by the process of claim 13.

17. An article comprising the composition according claim 1.

18. The composition according to claim 1, wherein the aromatic polyimide (A) is chosen from the group consisting of aromatic polyamide-imides (A-1) comprising more than 90% wt of recurring units (R1).

19. The composition according to claim 1, wherein the aromatic polyimide (A) is chosen from the group consisting of aromatic polyamide-imides (A-1) consisting of recurring units (R1).

20. The composition according to claim 1, wherein recurring units (R1) are a mix of recurring units of the formula:

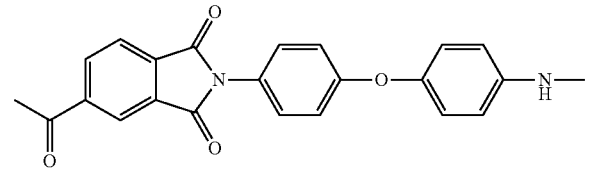

and/or the corresponding amide-amic acid containing recurring unit:

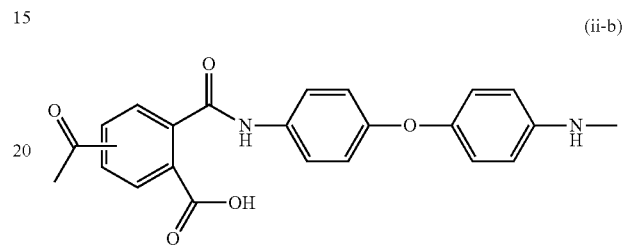

wherein the attachment of the two amide groups to the aromatic ring as shown in (ii-b) represents the 1,3 and the 1,4 polyamide-amic acid configurations,
with recurring units of the formula

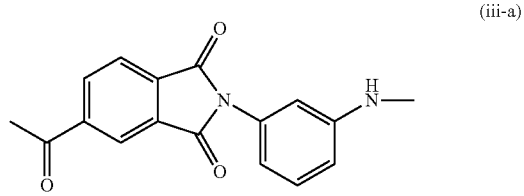

and/or the corresponding amide-amic acid containing recurring unit:

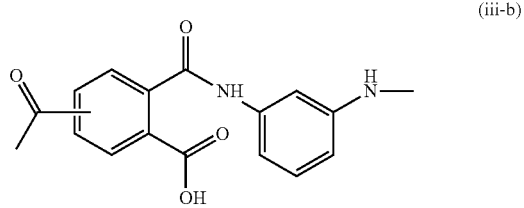

wherein the attachment of the two amide groups to the aromatic ring in (iii-b) represents the 1,3 and the 1,4 polyamide-amic acid configurations.

21. The composition according to claim 20, wherein the fluoroelastomer is a $VF_2$/HFP copolymer consisting of from 60 to 85% by moles of $VF_2$ and from 40 to 15% by moles of HFP.

22. A molding process of an aromatic polyimide composition, which comprises:
(I) melting the aromatic polyimide composition according to claim 1 at a temperature between 250 and 400° C., so as to obtain a melt composition;
(II) filling a mould cavity with the melt composition, so as to obtain a molded article;
(III) releasing the molded article.

* * * * *

UNITED STATES PATENT AND TRADEMARK OFFICE
CERTIFICATE OF CORRECTION

PATENT NO. : 8,008,408 B2
APPLICATION NO. : 11/572815
DATED : August 30, 2011
INVENTOR(S) : Gregory J Warkoski et al.

Page 1 of 1

It is certified that error appears in the above-identified patent and that said Letters Patent is hereby corrected as shown below:

Column 19, line 56,
"...composition according claim..." should read -- ...composition according to claim...--

Signed and Sealed this
Eighth Day of November, 2011

David J. Kappos
*Director of the United States Patent and Trademark Office*